US008860287B2

(12) United States Patent
Longtin et al.

(10) Patent No.: US 8,860,287 B2
(45) Date of Patent: Oct. 14, 2014

(54) WIND POWER GENERATION SYSTEMS INCLUDING SEGMENTED STATORS

(75) Inventors: Randy Scott Longtin, Schenectady, NY (US); Robert Michael Zirin, Niskayuna, NY (US); Kiruba Sivasubramaniam Haran, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/306,808

(22) Filed: Nov. 29, 2011

(65) Prior Publication Data

US 2012/0133145 A1  May 31, 2012

(51) Int. Cl.
| H02K 5/24 | (2006.01) |
| H02K 7/18 | (2006.01) |
| H02K 1/14 | (2006.01) |
| H02K 1/18 | (2006.01) |
| H02K 5/00 | (2006.01) |

(52) U.S. Cl.
CPC .......... *H02K 7/1838* (2013.01); *H02K 2213/12* (2013.01); *H02K 1/146* (2013.01); *Y02E 10/725* (2013.01); *H02K 1/185* (2013.01)
USPC ............................ 310/433; 310/432; 310/418

(58) Field of Classification Search
CPC .............. H02K 5/00; H02K 5/15; H02K 5/24
USPC .................................. 310/433, 432, 418, 431
IPC ....................................... H02K 5/00, 5/15, 5/24
See application file for complete search history.

(56) References Cited

U.S. PATENT DOCUMENTS

| 3,462,624 A * | 8/1969 | Darrieus .......................... 310/51 |
| 3,708,707 A | 1/1973 | Kranz |
| 3,777,197 A | 12/1973 | Preston et al. |
| 4,145,626 A | 3/1979 | Aroshidze et al. |
| 4,425,523 A * | 1/1984 | Detinko et al. ............... 310/433 |

(Continued)

FOREIGN PATENT DOCUMENTS

| GB | 2392013 A | 2/2004 |
| WO | 2008021401 A2 | 2/2008 |
| WO | 2011031165 A1 | 3/2011 |

OTHER PUBLICATIONS

Dubois, Maxime Roger Joseph; "Optimized Permanent Magnet Generator Topologies for Direct-Drive Wind Turbines", Jan. 26, 2004; pp. 1-268.
Skoog, Henric; "Concept for A Modular Assembly Direct Drive Permanent Magnet Generator", Uppsala Universitet, Jan. 2010, pp. 1-63.
Stander, Johan N. et al.; "Review of Direct-Drive Radial Flux Wind Turbine Generator Mechanical Design", Wind Energy, published online in Wiley Online Library Jul. 31, 2011, pp. 1-14.

*Primary Examiner* — Michael Andrews
(74) *Attorney, Agent, or Firm* — Francis T. Coppa

(57) ABSTRACT

The present disclosure relates to wind power generation systems having a segmented stator with a structural element and a plurality of coils. The wind power generation systems also include a rotor adapted to be rotated by wind to induce current in the plurality of coils and a lamination stack having a plurality of lamination plates disposed about the plurality of coils and a dovetail recess formed in the lamination stack. The wind power generation systems also include a dovetail bar adapted to be received by the dovetail recess and adjusted by a bolt to engage the lamination stack and the structural element of the segmented stator to form a torque transfer interface. Torque is adapted to be transferred from the lamination stack to the segmented stator via friction at the interface.

7 Claims, 5 Drawing Sheets

(56) References Cited

U.S. PATENT DOCUMENTS

| | | | |
|---|---|---|---|
| 4,536,671 A * | 8/1985 | Miller | 310/432 |
| 7,397,163 B2 * | 7/2008 | Cook et al. | 310/433 |
| 7,414,347 B2 | 8/2008 | Wang et al. | |
| 7,990,006 B2 | 8/2011 | Stiesdal | |
| 8,004,107 B2 | 8/2011 | Stiesdal | |
| 2002/0074884 A1 * | 6/2002 | Fuller | 310/91 |
| 2002/0163272 A1 | 11/2002 | Larsson et al. | |
| 2009/0256442 A1 * | 10/2009 | Stiesdal | 310/90 |
| 2010/0066096 A1 | 3/2010 | Stiesdal | |
| 2010/0123318 A1 | 5/2010 | Casazza et al. | |
| 2011/0062719 A1 | 3/2011 | Stiesdal | |

* cited by examiner

WIND POWER GENERATION SYSTEMS INCLUDING SEGMENTED STATORS

BACKGROUND

Wind turbines typically include multiple blades extending from a central hub. The hub is rotatably coupled to a nacelle suspended above the ground by a tower. Generally, the nacelle houses an electric generator coupled to the hub and configured to generate electrical power as the blades are driven to rotate by the wind. Wind turbine blades are typically designed and manufactured to efficiently transfer wind energy into rotational motion, thereby providing the generator with sufficient rotational energy for power generation. Wind power plants typically consist of multiple wind turbines of this type spread over a given geographic region. Wind passing over the region causes blades associated with each wind turbine to rotate, thereby generating electrical power.

Each wind turbine typically includes a variety of components that cooperate to translate the wind energy into electrical power. Typical wind turbines include a stationary stator having magnetic coils and a rotating rotor that induces current in the magnetic coils. In some systems, in order to generate the desired electrical power output, the stator may be dimensioned such that transport of the stator in its fully assembled form is impractical. Accordingly, in certain instances, it may be necessary to segment and disassemble the stator for transport and to reassemble the stator in the desired use location. Unfortunately, once assembled, the segmented stator may experience significant decreases in structural integrity due to the occurrence of undesirable radial deflections at the locations where the segments are joined. Accordingly, there exists a need for improved segmented stators that overcome this drawback.

BRIEF DESCRIPTION

In a first embodiment, a wind power generation system includes a segmented stator with a structural element and a plurality of coils. The wind power generation system also includes a rotor adapted to be rotated by wind to induce current in the plurality of coils and a lamination stack having a plurality of lamination plates disposed about the plurality of coils and a dovetail recess formed in the lamination stack. The wind power generation system also includes a dovetail bar adapted to be received by the dovetail recess and adjusted by a bolt to engage the lamination stack and the structural element of the segmented stator to form a torque transfer interface. Torque is adapted to be transferred from the lamination stack to the segmented stator via friction at the interface.

In a second embodiment, a wind power generation system includes a lamination stack having a plurality of lamination plates. The lamination stack is segmented into a first segment having a first portion of a male dovetail on an end of the first segment and a second segment having a second portion of the male dovetail on an end of the second segment. The wind power generation system also includes a clamp having a first clamp portion having a portion of a female dovetail recess adapted to receive the first portion of the male dovetail and a second clamp portion having a portion of the female dovetail recess adapted to receive the second portion of the male dovetail. The wind power generation system further includes a securement member adapted to couple the first clamp portion with the second clamp portion to maintain the first segment of the lamination stack and the second segment of the lamination stack in a substantially fixed relationship with respect to one another.

In a third embodiment a wind power generation system includes a lamination stack having a plurality of lamination plates and being segmented into a first segment and a second segment. The system also includes a first c-channel structure disposed on a first end of the first segment and a second c-channel structure disposed on a second end of the first segment, wherein the c-channel of the first c-channel structure and the c-channel of the second c-channel structure are disposed opposite one another along the first segment. The system also includes a third c-channel structure disposed on a first end of the second segment and a fourth c-channel structure disposed on a second end of the second segment, wherein the c-channel of the third c-channel structure and the c-channel of the fourth c-channel structure are disposed opposite one another along the first segment. Further, a securement member is adapted to couple pairs of the first c-channel structure, the second c-channel structure, the third c-channel structure, and the fourth c-channel structure to maintain the first segment of the lamination stack and the second segment of the lamination stack in a substantially fixed relationship with respect to one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

As described in detail below, provided herein are embodiments of segmented stators for use in wind power generation systems. A variety of coupling mechanisms may be utilized to couple segments of the segmented stators with one another. For example, in some embodiments, a dovetail bar adjustable within a dovetail recess may be utilized to secure a first portion of a lamination stack to a second portion of a lamination stack to maintain the first portion and the second portion in a substantially fixed relationship with respect to one another. For further example, in another embodiment, the portions of the lamination stack may each have a portion of a male dovetail, and a two-piece clamp having a dovetail recess may be secured about the male dovetail of the lamination stack with a securement member. Each of these coupling mechanisms may be utilized to connect portions of the segmented stator together such that during rotation of the rotor, the structural integrity (e.g. radial deflections, stresses, vibration response) of the stator is maintained, particularly at the connection points between segments of the segmented stator. The foregoing feature may offer distinct advantages over traditional systems, for example, in instances in which the stator segments are assembled at the point of use instead of being assembled prior to shipping.

Figure 1:
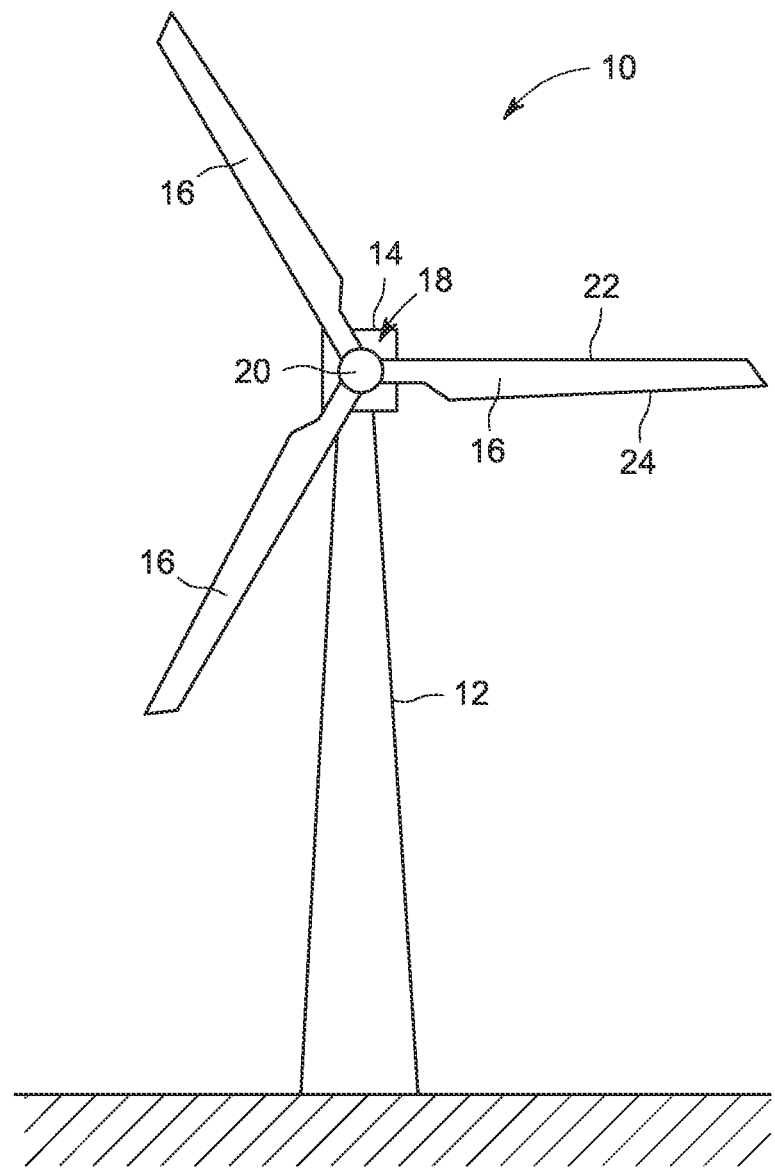
FIG. 1 is a front view of a wind turbine system for use in a wind power plant in accordance with aspects of the present disclosure.

Turning now to the drawings, FIG. 1 is a front view of a wind turbine system 10 capable of converting wind energy into electrical energy. The wind turbine system 10 includes a tower 12, a nacelle 14, and blades 16. The blades 16 are coupled to a generator 18 within the nacelle 14 by a hub 20 that rotates with the blades 16. The blades 16 are capable of converting the linear air flow from the wind into rotational motion. As the blades 16 rotate, the coupling between the hub 20 and the generator 18 within the nacelle 14 drives components of the generator 18 to rotate, thereby producing electrical energy. While three blades 16 are included in the wind turbine system 10 of the present embodiment, alternative embodiments may include more or fewer blades 16.

Each blade 16 includes a leading edge 22 and a trailing edge 24. The air flow engages the leading edge 22 and flows toward the trailing edge 24. Due to the shape of the blades 16, aerodynamic forces caused by the air flow induce the blades 16 to rotate, thereby driving the generator 18 to produce electrical power. Efficiency of the wind turbine system 10 is at least partially dependent upon converting linear air flow into rotational energy. Therefore, the blades 16 are generally configured to efficiently transfer wind energy into rotational motion. For example, blade shape may be selected to enhance air flow over the blade 16 such that aerodynamic forces induce the blade 16 to rotate. In addition, the blades 16 are typically manufactured to be substantially smooth, such that air flows over the blades 16 without interference.

Figure 2:
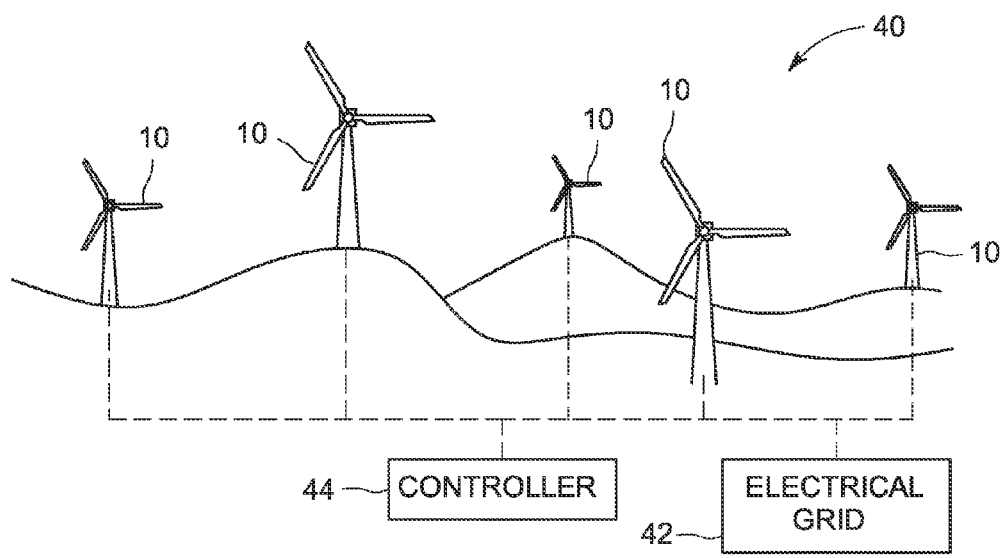
FIG. 2 is a schematic diagram of multiple wind turbine systems, as shown in FIG. 1, provided as part of a wind power plant, in accordance with aspects of the present disclosure.

With the foregoing discussion of a wind turbine system 10 in mind, FIG. 2 is a schematic diagram of a multitude of such wind turbine systems 10 disposed to function together as part of a wind power generation system, such as wind power plant 40. Electrical currents produced by the wind turbine systems 10 of the wind power plant 40 are provided to an electrical power grid 42, thereby providing electrical energy to consumers connected to the grid 42. Further one or more controllers 44 may be provided to control and/or monitor operation of the wind power plant 40. Such controllers 44 may be provided as general or special purpose computers (or other suitable processor-based systems) configured to execute code or routines that allow monitoring and/or control of the wind power plant 40 as a whole and/or of individual wind turbine systems 10 of the plant 40.

Figure 3:
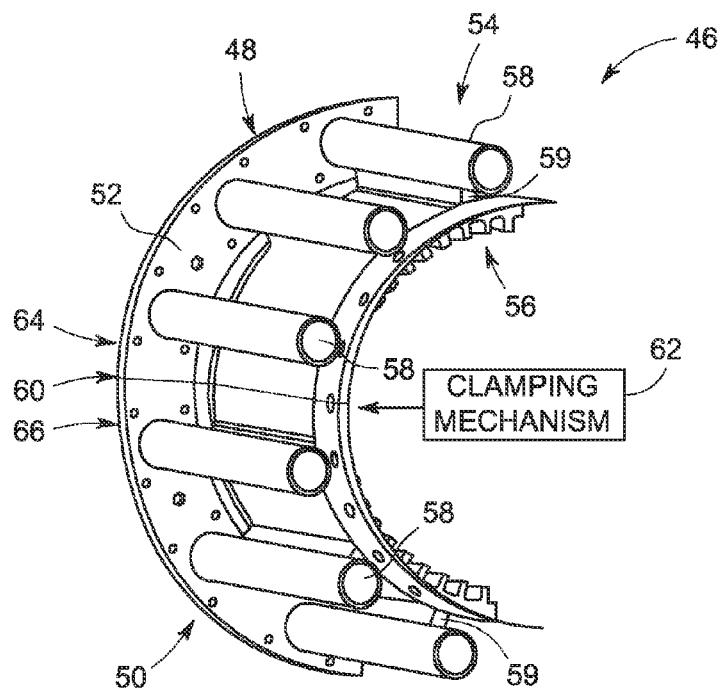
FIG. 3 is a perspective view of an embodiment of a segmented stator having a pipe superstructure coupled to a lamination stack and adapted for use in a wind turbine.

FIG. 3 is a perspective view of an embodiment of a segmented stator 46 suitable for use in the wind turbine system 10. The segmented stator 46 includes a first segment 48 and a second segment 50. As illustrated, each of the segments 48 and 50 include portions of the stator structures, which are segmented to facilitate shipping and subsequently assembled at the point of use. For example, in the depicted embodiment, the stator 46 includes a segmented end plate 52, a superstructure 54, and a segmented lamination stack 56 formed from a variety of axially stacked plates. The superstructure 54 includes a plurality of pipes 58 having dovetail bars 59 coupled thereto (e.g., via welding) in the illustrated embodiment, although the superstructure 54 may be any suitable structural element in other embodiments. Further, although the illustrated segmented stator 46 includes two segments 48 and 50, other embodiments may include any desired quantity of segments, depending on implementation-specific parameters, such as the desired capacity of the wind turbine system 10, which may dictate the overall size and/or angular average of the segmented stator 46. Additionally, although only half of the stator 46 is illustrated, one skilled in the art would understand that a full stator may be assembled before use.

As illustrated, when the first segment 48 and the second segment 50 are coupled together, an interface 60 is established between adjacent segments, and a clamping mechanism 62 may be utilized to couple an end portion 64 of the first segment 48 to an end portion 66 of the second segment 50. In certain embodiments, an air gap may be present at the interface 60, and the size of the air gap may vary based on tolerances present in the manufacture of each of the segments 48 and 50. The clamping mechanism 62 may be sufficiently adjustable to overcome the drawbacks associated with a variable air gap and maintain the first segment 48 in a substantially fixed position relative to the second segment 50 during operation of the segmented stator 46.

Figure 4:
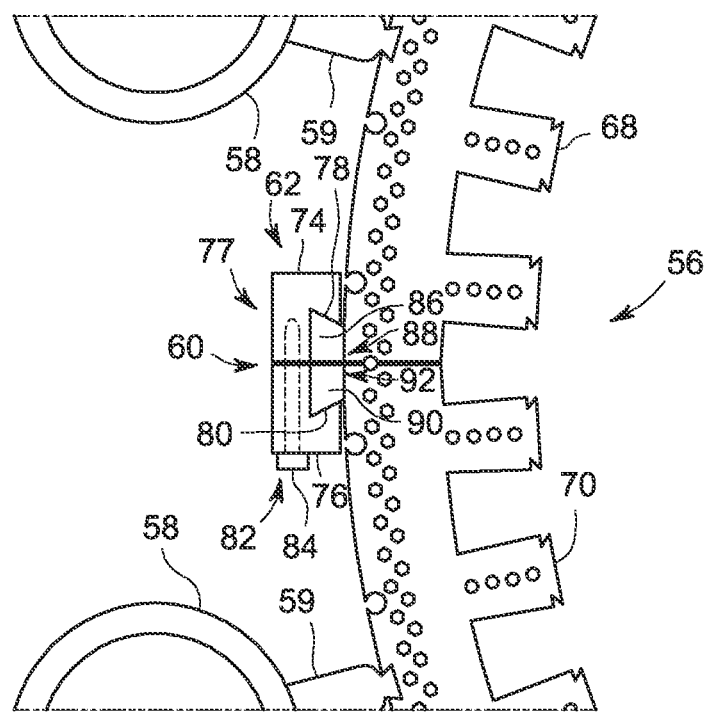
FIG. 4 illustrates segments of a lamination stack coupled together with a clamped dovetail assembly in accordance with an embodiment.

FIG. 4 illustrates an embodiment of the clamping mechanism 62 that may be utilized to couple a first portion 68 of the segmented lamination stack 56 and a second portion 70 of the segmented lamination stack. In this embodiment, the clamping mechanism 62 includes a clamp 72 having a first clamp portion 74 and a second clamp portion 76. The first clamp portion 74 includes a first portion of a female dovetail recess 78, and the second clamp portion 76 includes a second portion of the female dovetail recess 80. The clamping mechanism 62 also includes a securement member 82, such as bolt 84, capable of securing the first clamp portion 74 and the second clamp portion 76 together. Further, in this embodiment, a first portion of a male dovetail 86 is disposed on a first end 88 of the first segment 68 of the segmented lamination stack 56, and a second portion of the male dovetail 90 is disposed on a second end 92 of the second segment 70 of the segmented lamination stack 56.

During assembly, the female dovetail recess 78 of the first clamp portion 74 receives the male dovetail portion 86 disposed on the first lamination stack segment 68, and the second clamp portion 76 receives the male dovetail portion 90 disposed on the second lamination stack segment 70. Subsequently, as the bolt 84 is tightened, the male dovetail portions 86 and 90 contact the female dovetail recess portions 78 and 80, and the first clamp portion 74 and the second clamp portion 76 are clamped together, thus reducing the air gap between the lamination stack segments 68 and 70. The securement mechanism 82 may be adjusted depending on the size of the air gap that arises when the first segment 68 and the second segment 70 of the lamination stack 56 are positioned next to one another. Nevertheless, once the clamping mechanism 62 is adjusted to clamp the segments 68 and 70 of the lamination stack 56 together, an air gap between the lamination stack 56 and the rotor of the wind turbine may be maintained at a substantially constant value since the peak radial deformation at the interface 60 is substantially reduced via inclusion of the clamping mechanism 62.

In the illustrated embodiment, the securement mechanism 82 includes the bolt 84, but it should be noted that in other embodiments, the securement mechanism 82 may include a plurality of bolts or other adjustment devices capable of assembling the first clamp portion 74 and the second clamp portion 76 together. Additionally, although the male dovetail portions 86 and 90 are illustrated as single structures coupled to the end portions 88 and 92 of the segments 68 and 70, in some embodiments, the male dovetail portions 86 and 90 may each include a series of substantially similar dovetail portions, each disposed on a separate plate of the lamination stack 56.

Figure 5:
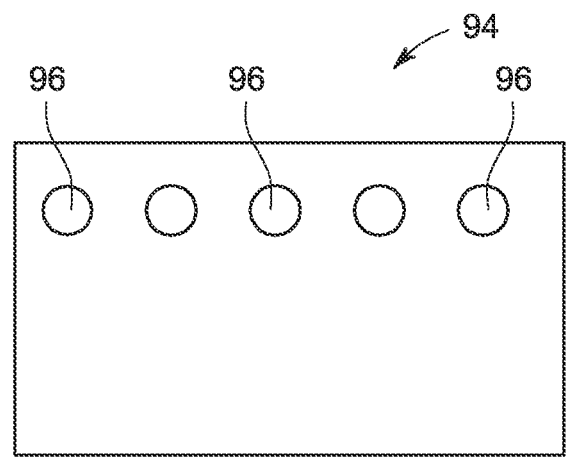
FIG. 5 illustrates a spacer that may be included in an embodiment of the clamped dovetail assembly of FIG. 4.

FIG. 5 illustrates a spacer 94 that may be included in the clamping mechanism 62 of FIG. 4 in embodiments in which it is desired to reduce the air gap between the segments 68 and 70 of the lamination stack before being clamped by the clamping mechanism 62. In the illustrated embodiment, the spacer 94 includes apertures 96 dimensioned to receive bolts 84 and capable of preventing or eliminating the likelihood of misalignment of the spacer 94 within the clamping assembly 62. In embodiments in which the clamping mechanism includes the spacer 94, the spacer 94 is inserted into the air gap between a first side including the first clamp portion 74 and the first dovetail portion 86 and a second side including the second clamp portion 76 and the second dovetail portion 90. During operation of the wind turbine, the spacer 94 may facilitate transfer of compressive loads between components of the stator assembly.

Figure 6:
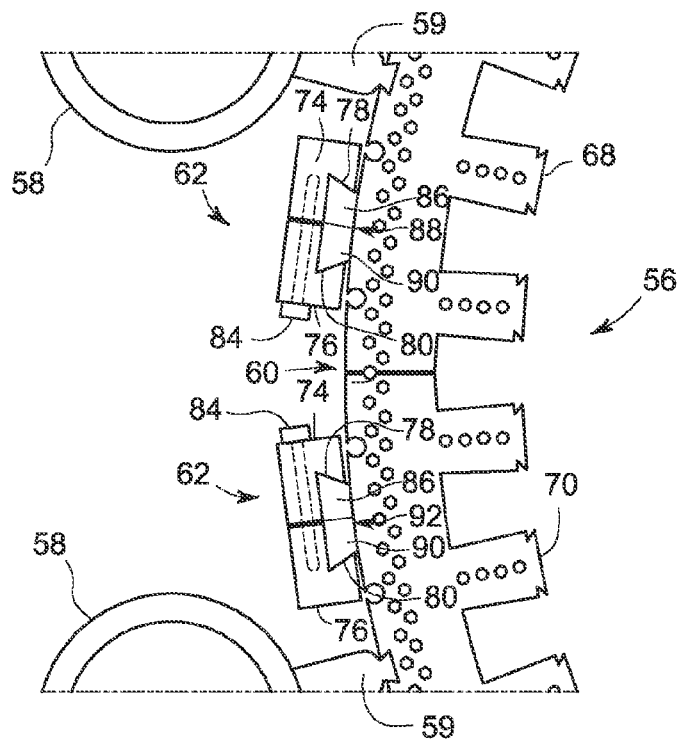
FIG. 6 illustrates a clamped dovetail assembly disposed on a portion of a lamination stack in accordance with an embodiment.

FIG. 6 illustrates the clamping mechanism 62 located on alternate portions of the ends 88 and 92 of the segments 68 and 70 of the segmented lamination stack 56. Specifically, in this embodiment, a first clamping mechanism 62 is located on the first end 88 of the first segment 68, and a second clamping mechanism 62 substantially similar to the first clamping mechanism is located on the end portion 92 of the segment 70. As such, in this embodiment, the clamping mechanism is not located at the interface 60 between the segments 68 and 70, but rather, the mechanism is located entirely on one segment or the other. The foregoing feature may provide stiffness to the ends 88 and 92 of the segments 68 and 70, thus possibly reducing radial deflections, which may be due to electromagnetic forces, at the cantilevered ends between 59 and 60 of each stator segment.

Figure 7:
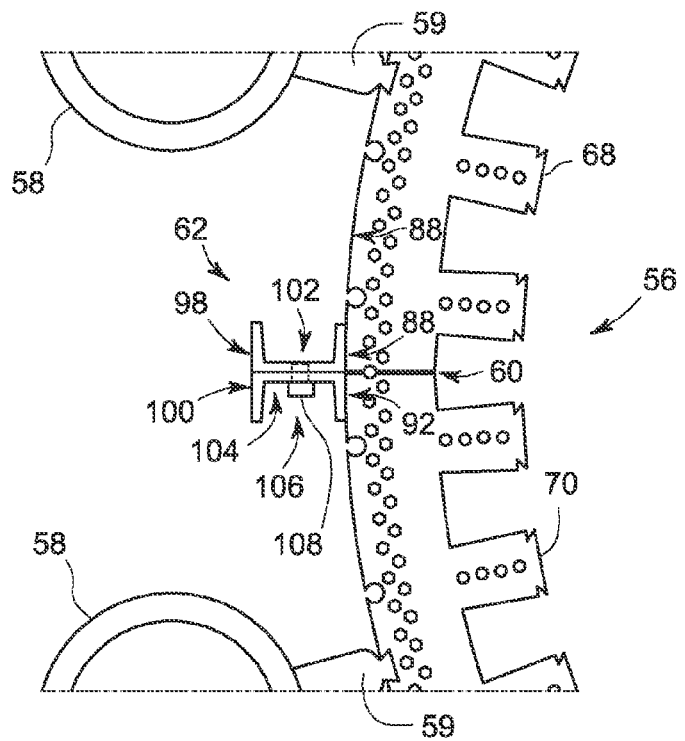
FIG. 7 illustrates segments of a lamination stack coupled together with a c-channel assembly in accordance with an embodiment.

FIG. 7 illustrates an alternate embodiment of the clamping mechanism 62 that clamps the end portion 88 of the first segment 68 of the lamination stack 56 to the end portion 92 of the second segment 70 of the lamination stack 56. In this embodiment, the clamping mechanism 62 includes a first c-channel structure 98 and a second c-channel structure 100. Although, only the first side of the segmented lamination stack 56 is shown in FIG. 7, as would be understood by one skilled in the art, a third c-channel structure and a fourth c-channel structure may similarly couple the non-illustrated ends of the segments 68 and 70. In the depicted embodiment, the first c-channel structure 98 includes a first c-channel 102, and the second c-channel structure 100 includes a second c-channel 104. As shown, the first c-channel 102 and the second c-channel 104 are disposed opposite one another during use. Further, a securement mechanism 106 having one or more bolts 108 tightens to couple the c-channel structures 98 and 100 together.

In certain embodiments, the first c-channel structure 98 and the second c-channel structure 100 are secured to the ends 88 and 92 of the segments 68 and 70 of the segmented lamination stack 56 via welding. However, it should be noted that the c-channels 98 and 100 may be coupled to the lamination stack segments 68 and 70 in a variety of suitable ways before or after the manufacture of the lamination stack 56. Additionally, as in previous embodiments, a spacer, such as spacer 94 of FIG. 5, may be placed in an air gap between the c-channels 98 and 100 before bolting.

Figure 8:
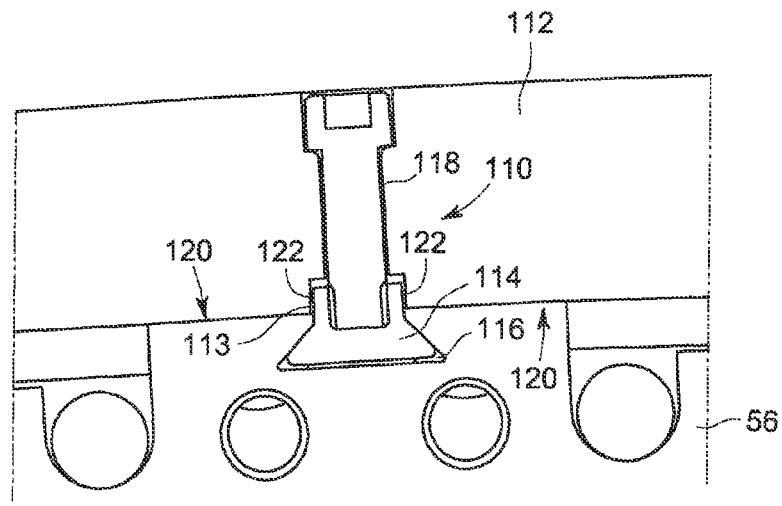
FIG. 8 illustrates a stator superstructure and a lamination stack coupled together with a dovetail assembly in accordance with an embodiment.

FIG. 8 illustrates an embodiment of a dovetail assembly 110 that may be utilized to secure the lamination stack 56, which may be segmented or non-segmented, to a structural element 112 of the stator. In this embodiment, the structural element 112 may be a stator superstructure formed as a barrel structure, while in other embodiments, the structural element may be any element of the stator that remains substantially stationary as the rotor of the wind turbine rotates. The illustrated embodiment of the dovetail assembly 110 includes a dovetail bar 114, a dovetail recess 116, and one or more bolts 118, which may be spaced axially and/or circumferentially. However, the dovetail assembly 110 is subject to considerable implementation-specific variations. For example, in one embodiment, the bolt 118 may be replaced by another securement device.

During use, the bolt 118 is screwed into the dovetail bar 114, and the dovetail bar 114 tightens, thus engaging the structural element 112 with the lamination stack 56 at a torque transfer interface 120. Accordingly, as the rotor of the wind turbine assembly is rotated by wind and current is induced in coils of the stator, torque is transferred due to tangential electromagnetic forces via the torque transfer interface 120 from the lamination stack 56 to the structural element 112 via friction at the interface 120. The foregoing feature as well as other features of presently disclosed embodiments may enable the bolts 118 to carry shear and tension loads while substantially reducing or eliminating the possibility of the bolts 118 carrying bending loads if slippage occurs (e.g. a short circuit event in which torque loads spike above normal) at interface 120 during operation of the rotor. For example, by providing an air gap 122 between the dovetail bar 114 and the structural element 112, the bending load on the bolt 118 may be designed such that it does not exceed the bolt's proof strength before contact occurs between 122 and 112. Once the air gap 122 is closed and the structural element 112 contacts the dovetail 114 at surface 113, excess load is transferred through this new contact interface while reducing or eliminating the possibility of yielding/failure of the bolt 118 or dovetail nut 114. In such cases, an interference fit may be established between the surface 113 of the dovetail bar 114 and the structural element 112.

During operation, in some embodiments, the adjustability of the dovetail assembly 110 may ensure that the laminations remain substantially engaged with the structural element 112 of the stator. For example, in embodiments in which bolts are screwed into the dovetail bars, the bolts may be adjusted to reduce or eliminate air gaps between the dovetail pressure planes and the laminations. The foregoing features may offer advantages over traditional designs that may inadequately attempt to fix the lamination stack to the stator.

Figure 9:
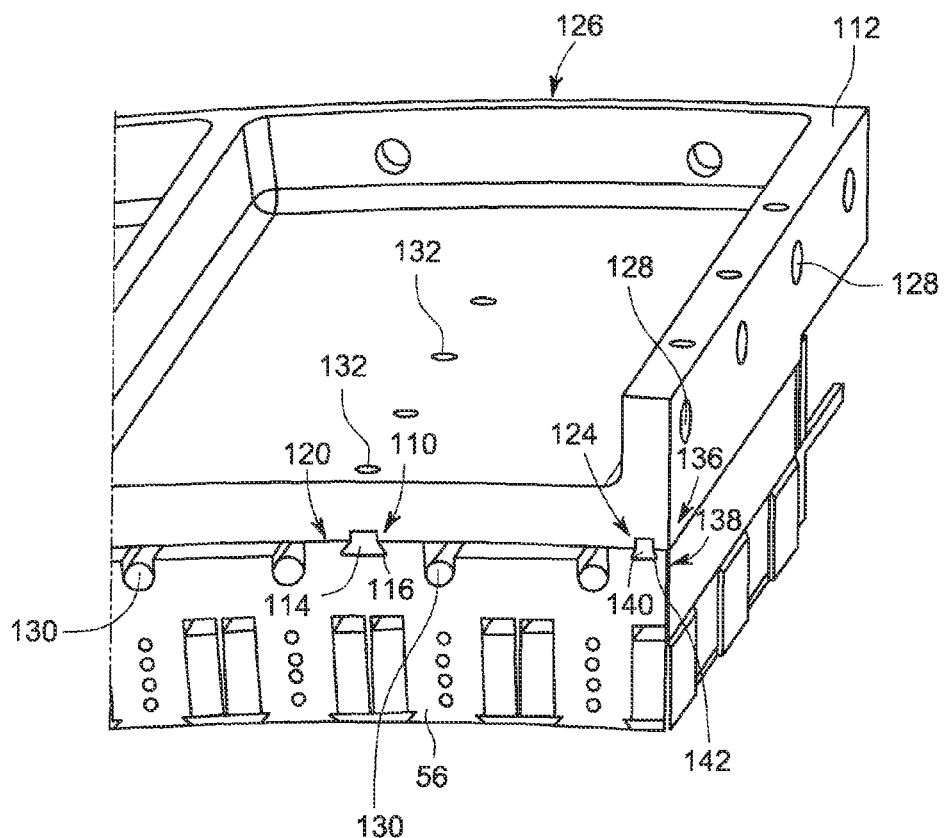
FIG. 9 illustrates a stator superstructure and a lamination stack coupled together with a dovetail assembly in accordance with an embodiment.

FIG. 9 illustrates an alternate embodiment of the structural element 112 being coupled to the lamination stack 56 via the dovetail assembly 110 and a second assembly 124. In certain embodiments, the assembly 124 may be dimensioned differently than the dimensions of assembly 110. For example, in the illustrated embodiment, the bolts of assembly 124 may be longer than the bolts of assembly 110, but the width of the dovetail nut may be smaller. In this embodiment, the structural element 112 is a substantially continuous superstructure 126. That is, the structural element 112 is substantially continuous throughout each segment of the segmented stator; the structural element 112 is not an array of substantially similar elements, such as barrels or pipes, as in previous embodiments. In one embodiment, the substantially continuous superstructure is a shell, as shown in FIG. 9. However, it should be noted that although only one segment is illustrated, when assembled, additional segments may be connected to the illustrated segment, for example, via insertion of bolts or other securement devices through apertures 128 and corresponding apertures in an adjacent segment. In this way, the ends of adjacent segments may be secured in a substantially fixed position relative to one another.

Further, the illustrated lamination stack 56 includes a plurality of tension rods 130 capable of lamination compressive preload of stack 56 throughout use. The dovetail assemblies 110 and 124 couple the lamination stack 56 to the structural element 112 of the stator. More specifically, during operation, the dovetail assembly 110 may be adjusted, as described in detail above with respect to FIG. 8, to bring together the structural element 112 and the lamination stack 56 at the interface 120. That is, as a bolts or other securement devices are tightened through apertures 132 in the structural element, the dovetail bar 114 is tightened, and engagement is established between the laminations of the lamination stack 56 and the structural element 112.

Still further, in the illustrated embodiment, the multi-piece dovetail assembly 124 is capable of tightening to couple an end portion 136 of the substantially continuous superstructure 126 to an end portion 138 of the lamination stack 138. In this way, the ends 136 and 138 of the superstructure 126 and the lamination stack 56 may be secured to one another to substantially reduce or elimination the inward radial deflection of the cantilevered end (e.g., the free end) of the lamination stack 56 when loaded. In the illustrated embodiment, the multi-piece dovetail assembly 124 includes a dovetail bar 140 and a dovetail recess 142 dimensioned to receive the dovetail bar 140. However, in other embodiments, the multi-piece dovetail assembly may include a variety of other suitable pieces, such as one or more securement mechanisms. For example, the dovetail bar 140 may be a two-piece assembly including a first male dovetail portion and a second male dovetail portion, each configured to be engaged by a securement mechanism, such as a bolt during tightening.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wind power generation system, comprising:
a segmented stator comprising a structural element and a plurality of coils;
a rotor configured to be rotated by wind to induce current in the plurality of coils;
a lamination stack comprising a plurality of lamination plates disposed about the plurality of coils and a dovetail recess formed in the lamination stack; and
a dovetail bar configured to be received by the dovetail recess and adjusted by an adjustment mechanism to engage the lamination stack and the structural element of the segmented stator to form a torque transfer interface, wherein torque is configured to be transferred from the lamination stack to the segmented stator via friction at the interface;
wherein each segment of the segmented stator comprises an arcuate, circumferential portion of the structural element, and wherein each portion of the structural element is configured to be bolted to another portion of the structural element, so that all of the joined circumferential segments form the stator.

2. The system of claim 1, comprising a plurality of tension rods disposed throughout the lamination stack and configured to maintain engagement between the plurality of lamination plates.

3. The system of claim 1, wherein the dovetail bar comprises a multi-pieced assembly.

4. The system of claim 3, wherein the multi-pieced assembly comprises an extension extending from a dovetail shaped base, and the adjustment mechanism comprises a bolt that is configured to be received by the extension.

5. The system of claim 4, wherein when the lamination stack and the structural element are engaged, an annular air gap is established between the extension of the dovetail bar and the structural element.

6. The system of claim 5, wherein an interference fit is configured to be established between a surface of the extension of the dovetail bar and the structural element to substantially close the annular air gap during the occurrence of a slippage event.

7. The system of claim 1, wherein the structural element of the segmented stator comprises a substantially continuous superstructure.

* * * * *